No. 728,926. PATENTED MAY 26, 1903.
F. JAEGER.
MIRROR.
APPLICATION FILED FEB. 16, 1903.
NO MODEL.
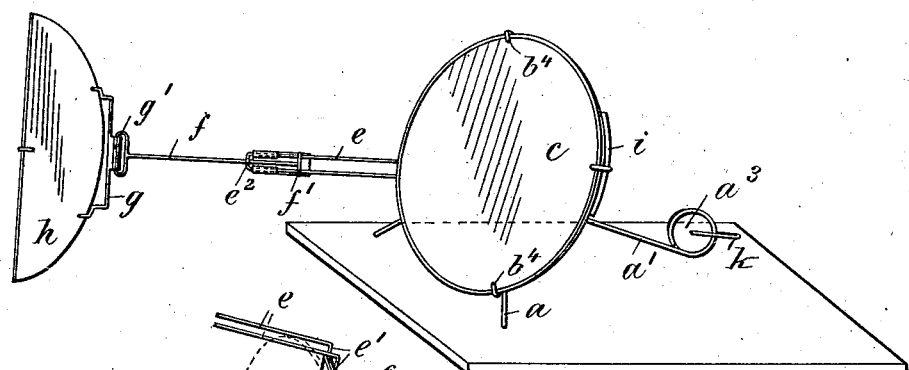
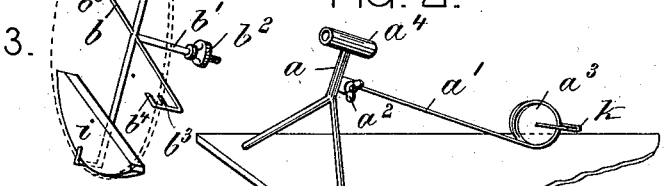
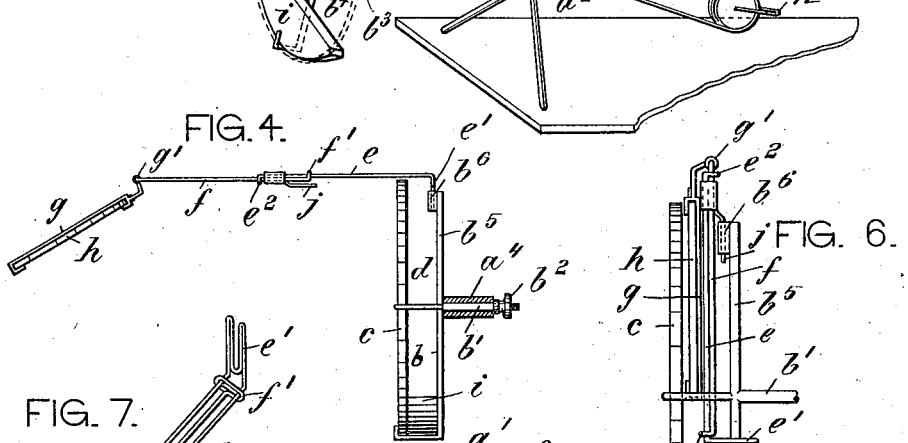

No. 728,926. Patented May 26, 1903.

UNITED STATES PATENT OFFICE.

FERDINAND JAEGER, OF NEW YORK, N. Y.

MIRROR.

SPECIFICATION forming part of Letters Patent No. 728,926, dated May 26, 1903.

Application filed February 16, 1903. Serial No. 143,476. (No model.)

*To all whom it may concern:*

Be it known that I, FERDINAND JAEGER, a citizen of the United States, and a resident of New York city, (Brooklyn,) county of Kings, and State of New York, have invented certain new and useful Improvements in Mirrors, of which the following is a specification.

This invention relates to a mirror for toilet, shaving, and similar purposes which is so constructed that the sides, top, and back of the head may be readily brought into view without changing the position.

In the accompanying drawings, Figure 1 is a perspective view of my improved mirror; Fig. 2, a similar view of the stand; Fig. 3, a perspective view of the mirror-holding frame; Fig. 4, a plan of the mirror-frame with the stand omitted; Fig. 5, a rear view of the mirror, showing it folded; Fig. 6, an enlarged side view thereof, and Fig. 7 a detail of the extensible holder.

The letter $a$ represents a stand which may be supported at different angles by means of a rear leg $a'$, connected to the stand by set-screw $a^2$. A counterweight $a^3$, carried by leg $a'$, prevents the stand from tilting. At its upper end the stand $a$ is provided with a bearing $a^4$, which receives the journal $b'$ of an axially-rotatable frame $b$, held in position by a nut $b^2$. The frame $b$ is composed of a series of bent arms adapted to hold the main reflector or mirror $c$ at right angles to the journal $b'$ and set forward from the frame, so that an intervening pocket $d$ is formed. The mirror $c$ is secured to the frame in the manner described by means of inner and outer pins $b^3 b^4$, as shown in Fig. 3. One of the arms $b^5$ of frame $b$ has an eye $b^6$, adapted for the reception of the bent end or hook $e'$ of a holder composed of a rear section $e$ and a front section $f$. These sections are connected by means of eyes $e^2 f'$ in such a manner that they are slidable upon one another and that the length of the holder may be readily adjusted.

To the forward end of section $f$ is connected by a hinge $g'$ a frame $g$ for holding an auxiliary mirror $h$, which is thus placed in front of mirror $c$. As the holder $e f$ extends in a direction parallel to the journal $b'$ of frame $b$, the rotation of the latter will cause a revolution of mirror $h$ around the rotating mirror $c$. Thus by changing the inclination of mirror $h$ and turning the frame $b$ every portion of the head may be readily brought opposite the mirror $h$, so as to be reflected by mirror $c$. It is therefore rendered possible to inspect the back, sides, and top of the head, as well as the chin, without twisting the neck.

In order to hold the mirrors $c$ $h$ in any position to which they may have been set, a counterweight $i$ is affixed to frame $b$ diametrically opposite eye $b^6$.

When it is desired to fold the device, the mirror $h$ is turned toward the arm $f$ and the bent end $e'$ of section $e$ is withdrawn from eye $b^6$. The holder is then contracted, Fig. 7, and secured by a hook $j$ to the eye $b^6$ in such a manner that the mirror $h$ is received by pocket $d$, Figs. 5 and 6.

If desired, the device may be suspended from a hook by means of an eye $k$, passing through weight $a^3$, the set-screw $a^2$ being previously slackened.

What I claim is—

1. A mirror composed of an axially-rotatable frame, a main reflector secured thereto at right angles to the axis, a holder secured to the frame, an auxiliary reflector hinged to the holder, and a counterweight on the frame opposite the holder, substantially as specified.

2. A mirror composed of a stand, a frame journaled therein, a main reflector secured to the forward end of the frame to form an intervening pocket, an adjustable holder removably secured to the frame, and an auxiliary reflector hinged to said holder, substantially as specified.

Signed by me at New York city, (Manhattan,) New York, this 14th day of February, 1903.

FERDINAND JAEGER.

Witnesses:
 WILLIAM SCHULZ,
 F. V. BRIESEN.